US007799726B2

(12) United States Patent
Pham-Huu et al.

(10) Patent No.: US 7,799,726 B2
(45) Date of Patent: Sep. 21, 2010

(54) COMPOSITES BASED ON CARBON NANOTUBES OR NANOFIBERS DEPOSITED ON AN ACTIVATED SUPPORT FOR USE IN CATALYSIS

(75) Inventors: Cuong Pham-Huu, Saverne (FR); Ricardo Vieira, Hoenheim (FR); Marc J. Ledoux, Strasbourg (FR); Loïc Charbonniere, Weyersheim (FR); Raymond Ziessel, Souffelweyersheim (FR)

(73) Assignees: Sicat, Paris (FR); Centre National de la Recherche; Scientifique, Paris (FR); Universite de Strasbourg, Strasbourg (FR)

( * ) Notice: Subject to any disclaimer, the term of this patent is extended or adjusted under 35 U.S.C. 154(b) by 275 days.

(21) Appl. No.: 10/496,495

(22) PCT Filed: Nov. 20, 2002

(86) PCT No.: PCT/FR02/03965

§ 371 (c)(1),
(2), (4) Date: Nov. 19, 2004

(87) PCT Pub. No.: WO03/048039

PCT Pub. Date: Jun. 12, 2003

(65) Prior Publication Data

US 2005/0103990 A1 May 19, 2005

(30) Foreign Application Priority Data

Nov. 23, 2001 (FR) .................................. 01 15178

(51) Int. Cl.
*B01J 21/18* (2006.01)
*D01C 5/00* (2006.01)
*D01F 9/12* (2006.01)

(52) U.S. Cl. .................. 502/180; 502/182; 502/185; 423/447.3; 423/447.5; 977/742; 977/744; 977/748

(58) Field of Classification Search ................ 502/180, 502/182, 185; 423/447.3, 447.5; 977/742, 977/744, 748
See application file for complete search history.

(56) References Cited

U.S. PATENT DOCUMENTS 5,165,909 A * 11/1992 Tennent et al. ........... 423/447.3
5,171,560 A * 12/1992 Tennent .................. 423/447.3
5,500,200 A    3/1996 Mandeville et al.
5,707,916 A *  1/1998 Snyder et al. ............... 502/180

(Continued)

FOREIGN PATENT DOCUMENTS

EP      1122344 A2    8/2001
WO    WO 97/41567 A1  11/1997
WO    WO 01/51201 A1   7/2001

OTHER PUBLICATIONS

Translation of Search Report for PCT/FR2002/003965.*

(Continued)

*Primary Examiner*—Patricia L Hailey
(74) *Attorney, Agent, or Firm*—Baker, Donelson, Bearman, Caldwell & Berkowitz

(57) ABSTRACT

A composite comprising a support activated by impregnation and carbon nanotubes or nanofibers formed by vapor deposition, wherein the weight of said carbon nanotubes or nanofibers formed on the said support is at least equal to 10.

39 Claims, 4 Drawing Sheets

U.S. PATENT DOCUMENTS

| | | | | |
|---|---|---|---|---|
| 6,358,878 | B1* | 3/2002 | Moy et al. | 502/180 |
| 6,413,487 | B1* | 7/2002 | Resasco et al. | 423/447.3 |
| 6,423,288 | B2* | 7/2002 | Mandeville et al. | 423/447.3 |
| 6,699,525 | B2* | 3/2004 | Jayatissa | 427/249.1 |
| 7,138,100 | B2* | 11/2006 | Smalley et al. | 423/447.3 |
| 2002/0172767 | A1* | 11/2002 | Grigorian et al. | 427/255.28 |
| 2003/0012722 | A1* | 1/2003 | Liu | 423/447.3 |

OTHER PUBLICATIONS

Ming Su et al, "A Scalable CVD Method for the Synthesis of Single-Walled Carbon Nanotubes With High Catalyst Productivity", Chemical Phycics Letters, May 26, 2000, Elsevier, Netherlends, vol. 322, No. 5, pp. 321-326.

Weidenkaff A et al, "Metal Nanoparticles for teh Production of Carbon Nanotube Composite Materials by Decomposition of Different Carbon Sources", Current Trends in Nanotechnologies: From Materials to Systems. Symposium S, EMRS Spring Meeting 2001, Strasbourg, France, Jun. 5-8, 2001, vol. C19, No. 1-2, pp. 119-123.

Hernadi K et al, "Fe-catalyzed Carbon Nanotube Formation", Carbon, Elsevier Science Publishing, New York, NY, US, vol. 34, No. 10, 1996, pp. 1249-1257, Feb. 1996.

Peigney A et al, "Carbon Nanotubes in Novel Ceramic Matrix Nanocomposites", Ceramics International, Elsevier Applied Science Publ, Barking, Essex, GB, vol. 26, No. 6, Jul. 17, 2000.

* cited by examiner a)

b)

COMPOSITES BASED ON CARBON NANOTUBES OR NANOFIBERS DEPOSITED ON AN ACTIVATED SUPPORT FOR USE IN CATALYSIS

CROSS REFERENCE TO RELATED APPLICATIONS

The present application is a 35 U.S.C. 371 National Stage application of International Application No. PCT/FR02/03965 filed Nov. 20, 2002 which claims priority to French Application No. 01/15178 filed Nov. 23, 2001, the content of which is incorporated herein by reference in its entirety.

BACKGROUND OF THE INVENTION

1. Technical Field of the Invention

The invention relates to the technical field of composites based on carbon nanotubes or nanofibers of large specific surface, intended for use as catalyst supports or as a catalyst for the chemical or petrochemical industry, in motor vehicle exhaust gas purification, or in satellite propulsion systems. Their advantage is that of combining the intrinsic properties of the base materials of carbon nanotubes or nanofibers with those of easily manipulated macroscopic structures.

2. Description of Related Art

The catalysts at present used in the fields of the chemical or petrochemical industry or in motor vehicle exhaust gas purification are essentially in the form of grains, extrusions, cylinders, or monoliths. These materials in the form of grains, extrusions, cylinders or monoliths may fulfill a catalyst support function, in which case an active phase is applied to the said support for forming the catalyst. This active phase is often constituted of metals or metal oxides. The said materials may also themselves show catalytic activity, and in this case they constitute the catalyst. The search for new catalysts which are more selective, of better performance, more durable, and more practical to utilize, concerns both the supports and the active phases.

Nanostructured compounds (mean diameter typically varying between 2 and 200 nm) based on carbon, such as nanotubes or nanofibers, have on the one hand great intrinsic mechanical strength, and on the other hand a large external exchange surface and a good interaction with the deposited active phase, permitting a strong dispersion of the latter. These new materials thus have physico-chemical properties of interest for their use in various fields such as catalysis or in reinforcing materials. According to the prior art (see the article by N. M. Rodriguez, A. Chambers and R. T. K. Baker, "Catalytic engineering of carbon nanostructures", Langmuir Review, vol. 11, pp. 3862-3866, 1995), these carbon-based nanostructured compounds are deposited from a gaseous phase containing ethylene, or a $CO-H_2$ mixture, on a substrate constituted either by a metallic powder or by a solid silica support impregnated with an aqueous solution of iron nitrate which is then calcined and reduced to iron to form an active phase. In both cases, the metal (copper or iron) acts as a catalyst for the formation of nanotubes or nanofibers from a vapor phase. Patent Application WO 01/51201 (Hyperion Catalysts International) gives other methods for preparation of carbon nanotubes and nanofibers and indicates their possible use as catalysts.

Methods of manufacturing nanotubes with a single wall are also known, in which the nanotubes are deposited by vapor deposition on an aerogel of alumina having a specific surface (of the order of 600 $m^2/g$) comprising a growth catalyst of Fe/Mo type (see the article "A scalable CVD method for the synthesis of single-walled carbon nanotubes with high catalyst productivity" by Ming Su, Bo Zheng and Jie Liu, Chemical Physics Letters 322, pp. 321-326 (2000).

Problem Posed

According to the state of the art, carbon-based nanostructured composites are synthesized only with low yields. Furthermore, their nanometric size renders their shaping and use difficult, and gives rise to problems of powder generation during transport and loading; it likewise makes their use impossible in fixed bed reactors, due to charge loss problems. Consequently, not only is the cost price of these compounds high, but also their use as catalyst or catalyst support in industrial processes is difficult and of little effectiveness.

The present invention has as its object to propose new composites based on carbon nanotubes or nanofibers which retain the advantages of these nanotubes or nanofibers, namely their ability to act as a support of a catalytically active phase, and their intrinsic catalytic activity, without having the known disadvantages of the said nanotubes or nanofibers, namely the difficulty of shaping them, the generation of dust, the difficulty of using them in a fixed bed reactor, and their cost.

SUMMARY OF THE INVENTION

The Applicant has found a new class of composite materials with high specific surface which may be used as catalysts or as support of the active phase in various fields such as catalysis, propulsion, and electrochemistry.

This class of materials consists of a composite comprising an activated support and nanotubes or nanofibers formed by vapor deposition. The support may be a macroscopic support in the form of beads, felts, fibers, foams, extrusions, monoliths, pellets, etc. The support surface intended to receive the deposit of carbon nanotubes or nanofibers should be activated beforehand by deposition of an active phase. The said composites combine the advantages acquired on macroscopic supports and those of isolated nanoscopic compounds which are the carbon nanotubes and nanofibers; in particular, they have a high specific surface.

The first object of the present patent application is a composite comprising a support activated by impregnation and carbon nanotubes or nanofibers formed by vapor deposition, characterized in that the weight of the said carbon nanotubes or nanofibers formed on the said activated support is at least equal to 10%, preferably greater than 20%, and more preferably greater than 30% of the total weight of the composite.

Another object of the present invention is the use of a composite comprising carbon nanotubes or nanofibers, vapor deposited on a support activated by impregnation, as a catalyst support for chemical reactions in a liquid or gaseous environment.

Another object of the present invention is the use of a composite comprising carbon nanotubes or nanofibers vapor deposited on an impregnation-activated support and an active phase deposited on the surface of the said nanofibers or nanotubes, as a catalyst for chemical reactions in a liquid or gaseous environment.

Yet another object of the present invention is the use of a composite comprising carbon nanotubes or nanofibers vapor deposited on an impregnation-activated support as an electrode in electrochemical processes or devices.

BRIEF DESCRIPTION OF THE DRAWINGS

FIG. 1a sows an activated support made of carbon felt impregnated with nickel. FIG. 1b shows the same support after growth of the carbon nanofibers.

DETAILED DESCRIPTION OF A PREFERRED EMBODIMENT

Figure 1:
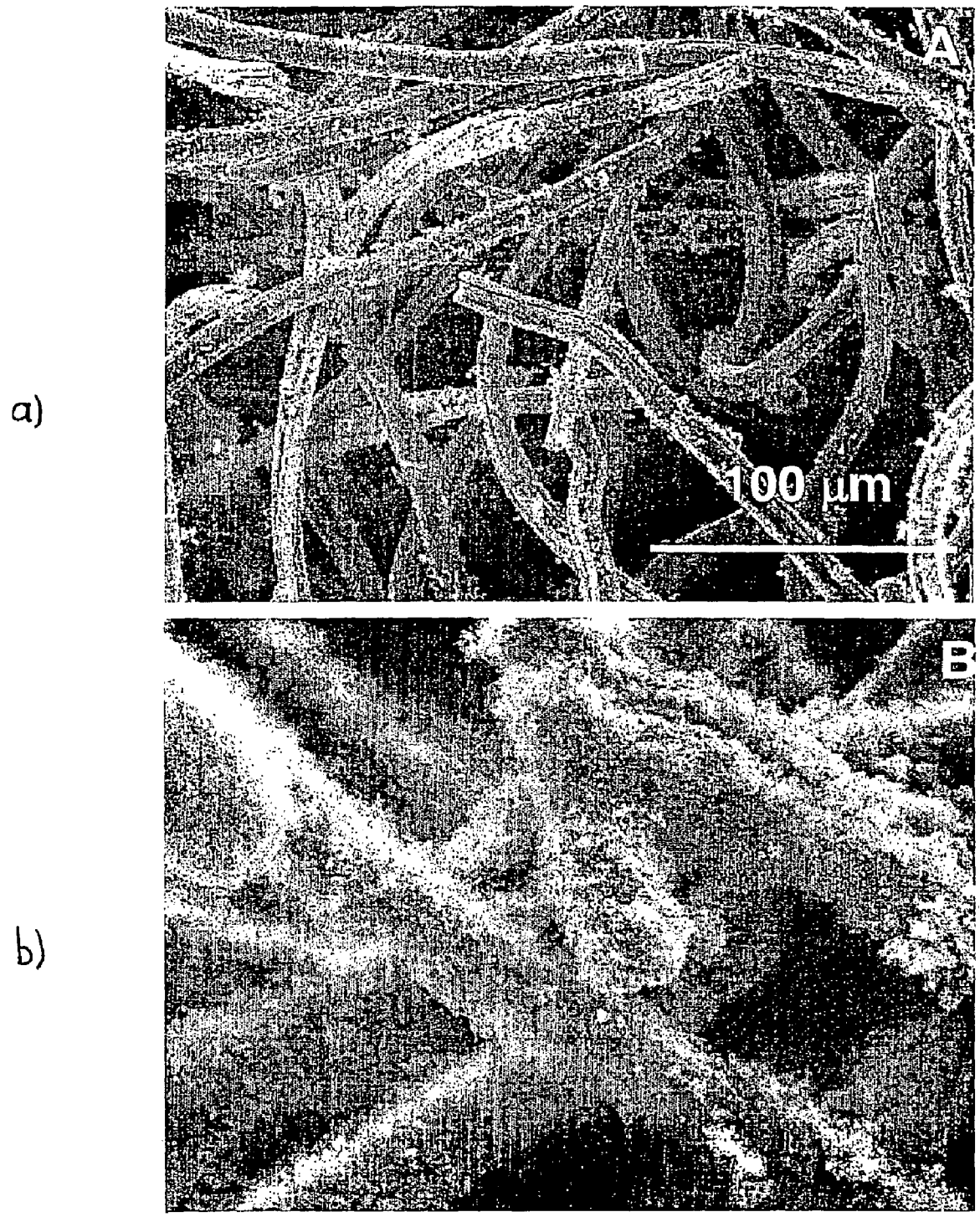
FIG. 1 shows two scanning electron microscope images with the same magnification (see Example 1).

The terms "carbon nanotubes or nanofibers" and "carbon-based nanostructured composites" denote here tubes or fibers of highly ordered atomic structure, hexagonal compounds of the graphite type, which can be synthesized under certain conditions (see the article "Carbon nanotubes" by S. Iijima, MRS Bulletin, pp. 43-49 (1994)). It is known that according to the conditions of synthesis by vapor deposition, and particularly according to the catalysts used, there can be obtained either hollow tubes, possibly formed of several concentric tubes of different diameters, or solid fibers, likewise of filamentary form, but containing graphitic carbon in a typically less ordered form. The said tubes or fibers may have a diameter typically comprised between 2 and 200 nm, this diameter being substantially uniform over the whole length of each tube or fiber.

Preparation of Composites According to the Invention

The macroscopic support should have sufficient thermal stability in a reducing medium, preferably up to at least 1,000° C. It may be in the form of beads, fibers, felts, extrusions, foam, monoliths or beads. It can advantageously be chosen from among alumina, silica, silicon carbide, titanium oxide, zirconium oxide, cordierite and carbon (particularly graphite and active carbon) in the different forms indicated hereinabove. The specific surface of the said macroscopic supports may very quite widely according to their origins. Advantageously, the said specific surface, determined by the BET method of nitrogen adsorption at the temperature of liquid nitrogen (Standard NF X 11-621) may represent 1 $m^2/g$ to 1,000 $m^2/g$ and more especially 5 $m^2/g$ to 600 $m^2/g$. Supports are preferred having a specific surface comprised between 7 $m^2/g$ and 400 $m^2/g$.

The support should be activated by deposition of an active growth phase; this favors the growth of carbon nanotubes and nanofibers in the presence of a mixture containing a hydrocarbon source and hydrogen. In the context of the present invention, this deposition is effected by impregnation of the surface intended to receive the deposit of carbon nanotubes or nanofibers with a solution of one or more salts of transition metals. In a preferred embodiment of the invention, this metal is chosen from the group comprising Fe, Ni, Co, Cu; the bi- or tri-metallic mixtures of these metals are likewise suitable. The concentration of the active phase, expressed as weight of metal, advantageously represents 0.1 to 20%, more preferably 0.2 to 15%, and yet more preferably 0.5 to 3%, of the weight of the said support. The low values are advantageously chosen for supports whose specific surface is rather low, while the elevated values are advantageously chosen for the supports whose specific surface is rather high. According to the Applicant's observations, the use of too great a quantity of metal may interfere with the catalytic activity of the composite if the metals used for the two catalytic functions (catalysis of growth of nanotubes or nanofibers, and catalysis of the chemical reaction aimed at in the industrial application of the composite) are different.

Due to its activation by deposition of an appropriate active phase, the activated support catalyses the growth of carbon nanotubes or nanofibers. Such an activated support may be prepared, for example, in the following manner:

Firstly, the support, present in the form of powder, pellets, granules, extrusions, foam, monoliths, or other agglomerated forms, is impregnated by means of a solution or a sol formed with a solvent such as water or any other organic solvent such as dichloromethane or toluene and a desired metal or metals in the form of salts.

The thus impregnated support is dried, and the dried support is calcined at temperatures which may range from 250° C. to 500° C., under or not under an inert atmosphere. The support is then placed in contact with a reducing agent consisting of pure hydrogen, pure or mixed with an inert gas, or any other gaseous source containing a reducing agent. The reduction is effected at temperatures below 600° C. and preferably comprised between 300 and 400° C. and for a time comprised between 0.2 hours and 3 hours and preferably between 0.5 hour and 1 hour. The step of reduction may be effected either outside the synthesis reactor followed by storage of the resulting solid in air, or directly in the reactor just before the synthesis of the nanotubes or nanofibers.

The growth of the carbon nanotubes or nanofibers is effected by subjecting the solid to a gas flow containing hydrogen and a carbon source to a temperature greater than 500° C., preferably comprised between 500 and 1,000° C., and more preferably between 550 and 750° C., and under a pressure comprised between 1 and 10 atmospheres, and preferably comprised between 1 and 3 atmospheres. The gas containing free hydrogen or an inert gas and the gas containing the carbon source may be brought separately into contact with the macroscopic catalyst. However, in order to obtain a very homogeneous gaseous reaction medium during contact with the activated support, it is preferable to first of all mix the gas containing the carbon source with the gas containing hydrogen or the inert gas and to bring the thus constituted mixture into contact with the activated support.

The gas containing free hydrogen or an inert gas is used in a suitable quantity to provide a molar ratio H2:C going from 0.5 to 10, and preferably from 0.1 to 1 in the reaction medium coming into contact with the activated support. The carbon source may be any molecule containing at least one carbon atom, but is preferably a hydrocarbon, or carbon monoxide diluted in a stream of inert gas in the presence of hydrogen. The hydrocarbon may be any saturated or olefin, C1-C6 hydrocarbon, preferably a C1-C4 saturated hydrocarbon, and more preferably a saturated hydrocarbon of chain length comprised between C1 and C3. Methane and ethane are preferred among these different families of hydrocarbons.

The contact time between the reagents and the solid I comprised between 0.5 second and several minutes. preferably between 0.5 and 60 seconds and more preferably between 1 and 30 seconds. The total pressure of the synthesis may be variable and comprised between 1 and 10 atmospheres, preferably between 1 and 5 atmospheres and more preferably between 1 and 3 atmospheres. The duration of the synthesis is comprised between 1 hour and 24 hours, preferably between 2 hours and 12 hours and more preferably between 2 hours and 6 hours. In a preferred embodiment, this duration is chosen such that the quantity deposited in the form of carbon nanotubes or nanofibers, in weight of carbon, is at least five times, and preferably between twenty times and a hundred times, and yet more preferably between fifty times and a thousand times, greater than the weight of the active phase, expressed in weight of metal.

After synthesis, the solid is cooled under the reaction medium to 200° C.; the mixture is then replaced by pure hydrogen down to ambient temperature. The solid is then discharged and stored under air at ambient temperature.

Characteristics and Advantages of Composites According to the Invention

The morphology of the carbon nanotubes or nanofibers according to the invention is characterized by nano-structured carbon in the form of nanotubes or nanofibers of mean diameter comprised between 5 nm and 200 nm. The mean diameter of the carbon nanotubes or nanofibers may vary quite widely according to the starting catalysts used in the active phase, and according to the synthesis conditions. Advantageously, the said diameter, determined by scanning and transmission electron microscopy, varies between 0.01 micrometer and 20 micrometers, and more preferably 0.05 micrometers and 10 micrometers. The mean length of these and tubes is located between several tens and several hundreds of micrometers. The macroscopic morphology of the starting supports is preserved.

The specific surface, measured by the BET method of nitrogen adsorption at the temperature of liquid nitrogen (NF X 11-621 Standard), of composite materials according to the invention, is typically comprised between 1 and 1,000 $m^2/g$; it is preferably greater than 10 $m^2/g$. For most of the envisaged industrial applications, composites may be used with a value comprised between 10 $m^2/g$ and 100 $m^2/g$. Their pore distribution is essentially mesoporous, with a mean size comprised between 5 and 60 nm. It is preferable that the microporous surface is the smallest possible, and represents less than 10% of the total contribution of the surfaces.

In a preferred embodiment of the invention, the weight of the carbon nanotubes or nanofibers formed on the support is at least equal to 10%, preferably greater then 20% and more preferably greater than 30% of the total weight of the composite.

The hardness of the composites according to the invention is distinctly higher than those of the support materials, because the formation of carbon nanotubes or nanofibers at the surface and in the matrices of the said starting materials.

Advantages of the Composites According to the Invention

The composites according to the invention have numerous advantages, with respect on the one hand to the known supports, and on the other hand with respect to the known carbon nanotubes or nanofibers. Their manipulation is easy because the macroscopic form of the support is preserved, the deposited carbon nanotubes or nanofibers not in any way modifying the morphology of the support. Their external exchange surface is large, in the same way as their specific surface, with respect to that of the starting solid, because of the presence of carbon nanotubes or nanofibers on the external surface. Their thermal and electrical conductivities are good, due to the presence of carbon nanotubes or nanofibers at the surface (case of monoliths). The strong interaction between the carbon nanotubes or nanofibers and the precursor salts of the active phase ensures a good dispersion of the latter. Due to the strong interaction between the nanotubes or nanofibers and the macroscopic support, the problem does not arise of the generation of dust during the manipulation of these materials, which is one of the disadvantages of the known carbon-based nanostructures; this absence of powder likewise facilitates the separation of the catalysts and the reaction products, which is a property of prime importance for liquid phase reactions.

Likewise, the small size of the carbon nanotubes or nanofibers permits considerable reduction of weight transfer phenomena. The composites according to the invention furthermore have very strong resistance as regards problems of sintering caused by steam or thermally, compared with that of the conventional solid oxide supports such as alumina (Al2O3), silica ($SiO_2$), $TiO_2$, or $ZrO_2$.

All these mew properties confer on the composites according to the invention a strong [potential for application in various fields, such as catalysis, propulsion, and electrochemistry, or in the fields of mechanical reinforcement if materials working under high stress or under friction.

Industrial Applications of the Composites According to the Invention

The composites according to the invention may have numerous industrial applications. They can be used as catalyst supports or directly as catalysts of chemical reactions in chemical industry, petrochemical industry, or in the purification of motor vehicle exhaust gas. They have increased resistance, both mechanical and chemical, under working conditions in the presence of a high steam pressure or in a moist atmosphere.

By way of example, the composites according to the invention may directly catalyze Friedel-Crafts acylation in a liquid medium.

After application of an appropriate active phase, they may catalyze the decomposition of hydrazine and its derivatives and of hydrogen peroxide (active phase: Ir (preferably) or Ru), ammonia synthesis in the presence of N2 and H2 (active phase: Ru (preferably) or Fe), selective or total oxidation such as CO oxidation to $CO_2$ (active phase: Ni or Fe), hydrogenation-dehydrogenation, such as the hydrogenation of nitro-aromatics or of aromatics (active phase: Pt or Pd).

The Applicant has shown that the composites according to the invention may be used as an electrode in electrochemical processes or devices.

Due to their increased mechanical strength, they may be used in fields other than catalysis, for example, as reinforcing materials in materials working under strong frictional stress. Furthermore, the deposition of the carbon nanotubes or nanofibers considerably increases mechanical strength against crushing of the final composite with respect to that of the starting material: this surface deposit according to the invention may thus act as a surface treatment to protect the substrate. Thus, composites according to the invention may be used as reinforcement or protection of materials or elements working under friction.

EXAMPLES

To complete the preceding description, a series of non-limiting examples illustrating the invention are given below.

Example 1

Preparation of a Composite Based on Carbon Nanofibers Deposited on Carbon Felt

The support consisting of carbon felt is composed of a network of carbon fibers having an external diameter centered on 0.01 mm and a specific surface measured by the BET method, of 10 $m^2/g$. The felts are first treated in a mixture of aqua regia (HCl, HNO3) at ambient temperature for 6 hours, to prepare their surface (which is originally hydrophobic) for impregnation.

Nickel in the form of nitrate (with distilled water as solvent) or acetylacetonate (with toluene as solvent) is deposited on the surface by successive impregnations. The impregnated supports are then dried in air at 100° C. for 6 hours, followed by calcinations in air at 400° C. for 2 hours with transformation of the nickel salts into oxide.

The samples are then placed in a tubular oven and swept with a stream of argon at ambient temperature for 1 hour. The argon is replaced with hydrogen, and the temperature is progressively raised from ambient to 400° C. (heating gradient 5° C./min) and kept at this temperature for 2 hours; the nickel oxide is reduced to metal. The temperature is then raised from 400° C. to 700° C. and the stream of hydrogen is replaced by the reaction mixture containing hydrogen and ethane. The total flow rate is fixed at 150 ml/min (H2: 100 ml/min and C2H6: 50 ml/min). The duration of the synthesis is fixed at 6 hours. After synthesis, the samples are cooled under the reaction mixture to 200° C., and the reaction mixture is replaced by pure hydrogen.

FIG. 1a shows a scanning electron microscope image of carbon felt, impregnated beforehand with nickel. The diameter of the fibers forming the felt is centered around 10 micrometers. FIG. 1b shows the morphology of the composite, carbon nanofibers on carbon felt, obtained after growth under a stream of hydrogen and ethane at 700° C. The diameter of the filaments in the composite is greatly increased; it is now of the order of four times greater than that of the starting filaments (FIG. 1a). The presence of carbon nanofibers is clearly visible in the form of small filaments. Observation at greater magnification gives a diameter of the nanofibers between 80 and 100 nm.

Figure 2:
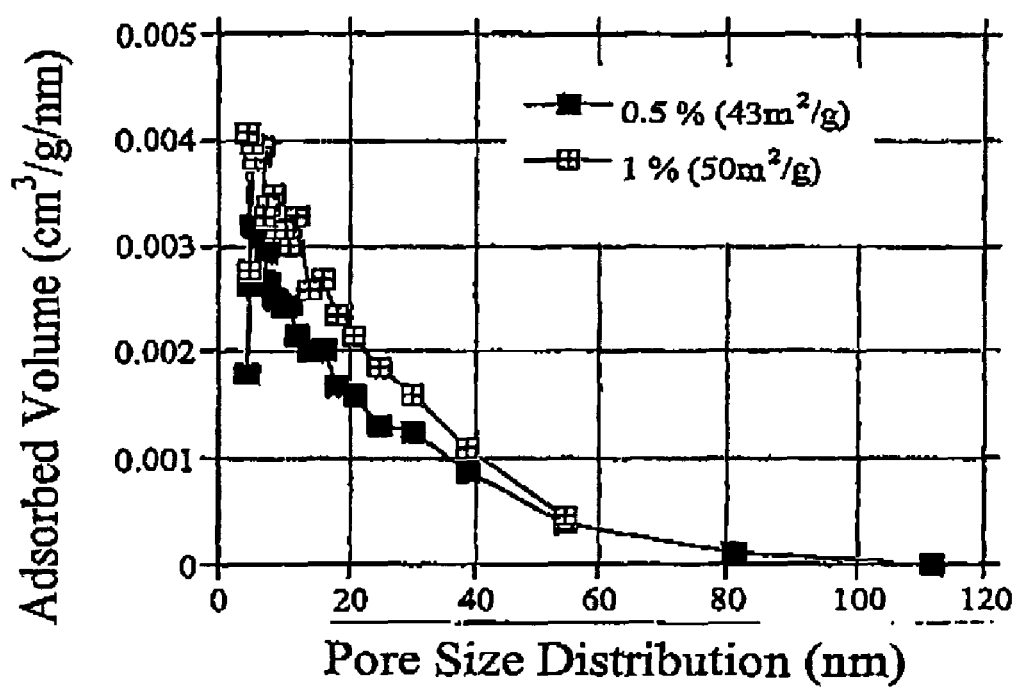
FIG. 2 shows the pore distribution of two composites according to the invention (see Example 2).

The different characteristics of the samples obtained at 700° C. and with a synthesis duration of two and six hours are shown in Table 1. The gain in weight resulting from the formation of carbon nanofibers on the surface of the graphite felts varies little as a function of the nickel concentration, while the duration of the synthesis has an influence, not negligible, on the specific surface of the carbon nanofibers. The formation of carbon nanofibers on the surface of the support significantly increases the specific surface, measured by the BET method, of the samples as well as their porosity, essentially in the region of the mesopores between 3 and 20 nm, as is shown by the pore distribution of composites based on carbon nanofibers deposited on graphite felts (FIG. 2)

TABLE 1

Characteristics of composites obtained in Example 1
(Conditions: 700° C., $H_2$: 100 ml/min, $C_2H_6$: 50 m;/min)

| Sample | Metal content (% by weight) | Duration (h) | Gain in weight (% by weight) | Specific surface ($m^2/g$) | Pore volume (ml/g) |
|---|---|---|---|---|---|
| 1 | 0.5 | 2 | 58 | 43 | 0.12 |
| 2 | 0.5 | 6 | 86 | 34 | 0.13 |
| 3 | 1 | 2 | 52 | 50 | 0.14 |
| 4 | 1 | 6 | 94 | 42 | 0.14 |

This increase of surface is attributed to the formation of carbon nanofibers on the surface of the starting macroscopic support. The basal planes of the graphite present in the nanofibers contribute to the augmentation of the specific surface observed in the composites. Nevertheless, the total specific surface of the composites decreases substantially when the duration of the synthesis goes from 2 hours to 6 hours.

The mechanical hardness of the composites obtained is greatly ameliorated with respect to those of the starting graphite felt.

The strength of the carbon nanofibers formed on graphite felts is characterized by subjecting the composite obtained to a sonication in an ultrasonic water bath for a duration of at least half an hour with a nominal power of 1,100 W at a frequency of 35 kHz. The absence of residues in the solution indicates that the fibers are not detached from the surface of the composite during the operation, thus indicating the great resistance to attrition of the composite.

Example 2

Preparation of a Carbon Nanofibers Deposited on a Monolithic $TiO_2$ Support

The $TiO_2$ monolith is characterized by square channels of 3 mm side and a wall thickness of about 0.5 mm. The starting material has a specific surface, measured by nitrogen absorption, of the order of 100 m3/g. Before synthesis, the material is subjected to a thermal treatment at 700° C.; the phenomena of sintering and of phase transition lead to a non-negligible loss of the initial specific surface, which becomes 45 $m^2/g$ (Table 2). The synthesis is performed under a mixture containing 100 ml/min of hydrogen and 100 ml/min of ethane. The duration of the synthesis is fixed at two hours. After synthesis, the samples are cooled under reaction mixture to 200° C., then under hydrogen to ambient temperature.

The physical characteristics of the samples obtained at 700° C. and two hours of synthesis are shown in Table 2. The formation of carbon nanofibers on the surface of the monolithic support considerably increases its specific surface, from 45 $m^2/g$ to 100 $m^2/g$. The pore distribution was likewise modified due to the formation of carbon nanofibers.

TABLE 2

Characteristics of the composites obtained in Example 2

| Sample | Metal content (% by weight) | Duration (h) | T (° C.) | Specific surface ($m^2/g$) | Pore volume (ml/g) |
|---|---|---|---|---|---|
| 1 | 0 | 2 | 700 | 46 | 0.22 |
| 2 | 1 | 2 | 700 | 98 | 0.17 |
| 3 | 1 | 2 | 700 | 45 | 0.12 |
| 4 | 1 | 6 | 800 | 50 | 0.09 |
| 5 | 2 | 2 | 700 | 88 | 0.11 |
| 6 | 2 | 2 | 800 | 55 | 0.12 |
| 7 | 2 | 12 | 700 | 59 | 0.09 |

Figure 3:
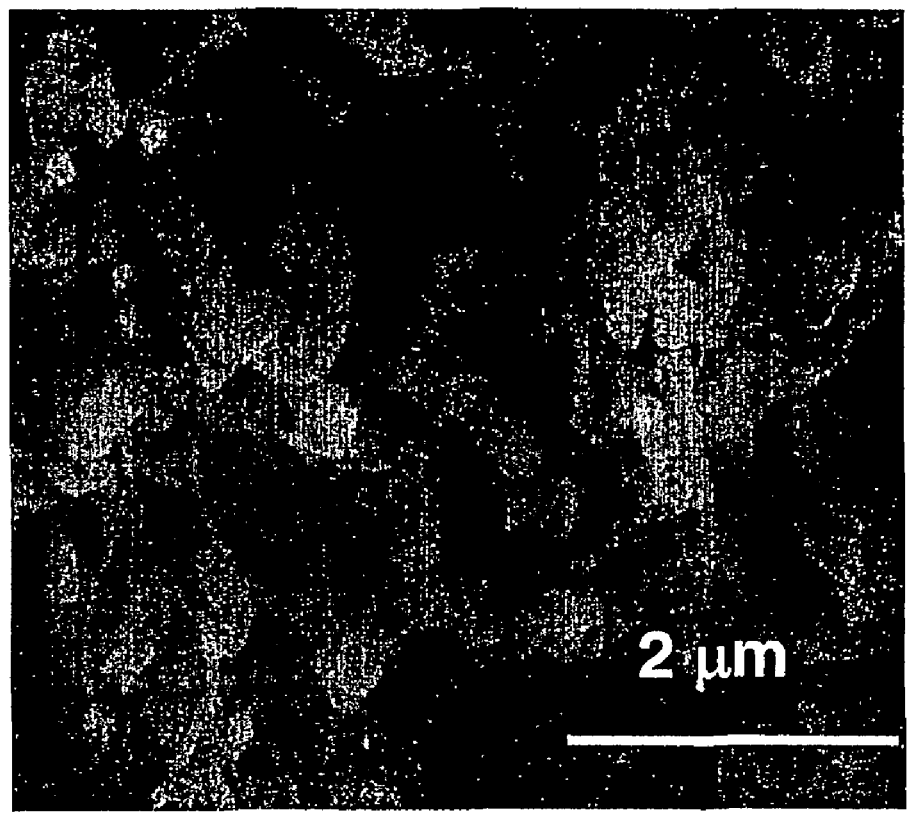
FIG. 3 shows a scanning electron microscope image of carbon nanofibers formed on the surface of a graphite electrode (see Example 3).

The pore distribution of the composites obtained is shown in FIG. 3 as a function of the temperature and duration of the synthesis. In this case it is likewise to be noted that the formation of carbon nanofibers has significantly contributed to the mechanical behavior of the said composites.

Example 3

Preparation of a Composite of Carbon Nanofibers Deposited on a Vitreous Carbon Disk for Electrochemical Applications A disk of vitreous carbon, 2 cm in diameter and 0.4 cm thick, is first washed by dipping into an aqua regia mixture HCl/$HNO_3$), followed by copious rinsing with distilled water and drying at 100° C. One surface of the disk is then impregnated by deposition of aqueous nickel nitrate solution (1.4 mg/1 ml), followed by evaporation of the water at 100° C. under air overnight.

The sample is then calcined at 300° C. for two hours in air, then for an hour at 400° C. under a stream of hydrogen. The formation of nanofibers is obtained by treating the sample under a stream containing a mixture of hydrogen (100 ml/min) and ethane (50 ml/min) at 650° C. for 2 hours. During this step, the sample is placed horizontally in the tubular oven with the nickel-treated surface upward. After synthesis, the sample is cooled under the reaction mixture to 200° C., then under a stream of pure hydrogen to ambient temperature. The sample is then discharged, then stored in air.

The composite thus obtained is composed of one smooth surface, while the other surface has excrescences visible to the naked eye. The weight of the disk has increased by 10%. FIG. 3 shows a scanning electronic microscope image entanglements of carbon nanofibers whose diameter varies of carbon nanofibers formed on the surface of a graphite electrode under a stream of hydrogen and ethane at 650° C. The formation is to be distinguished on the disk surface of from several tens of nanometers to several hundreds of nanometers. These modified electrodes are electroactive. In particular, catalytic currents corresponding to the reduction of $CO_2$ to CO have been measured by cyclic voltammetry under Ar and under $CO_2$ in acetonitrile containing 20% of water and in a purely aqueous medium. The current densities i are between 1.6 mA/cm2 and 10.6 mA/cm2.

Example 6

Preparation of a Composite of Carbon Nanotubes Deposited on a Carbon Felt Support The support is similar to that of Example 1, and is prepared by the same procedure. The nanotube growth catalyst is iron, which is deposited of the carbon felt following the same mode of impregnation as that used in Example 1. The thermal treatments are likewise identical.

The samples are then placed in a tubular oven and swept with a stream of argon at ambient temperature for 1 hour. The argon is replaced by hydrogen, and the temperature is raised progressively from ambient to 400° C. (heating gradient 5° C./min) and kept at this temperature for 2 hours; the iron oxide is reduced to metal. The temperature is then raised from 400° C. to 750° C. and the stream of hydrogen is replaced by the reaction medium containing hydrogen and ethane. The total throughput is fixed at 100 ml/min (H2: 50 ml/min and n-$C_2H_6$: 50 ml/min). The duration of the synthesis is fixed at 6 hours. After synthesis, the samples are cooled under the reaction mixture to 300° C., and the mixture is then replaced with pure hydrogen.

The composite obtained has the same characteristics as that based on carbon nanofibers described in example 1. The total specific surface of the composite is slightly lower and varies between 20 and 40 m²/g.

Example 5

Acylation of Anisole by Benzoyl Chloride on Composite Based on Carbon Nanotubes

The composite of carbon nanotubes on graphite felt is used, without any treatment beforehand, in the reaction of acylation of anisole by benzoyl chloride according to the following equation:

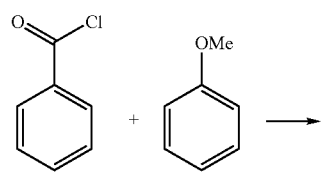

-continued

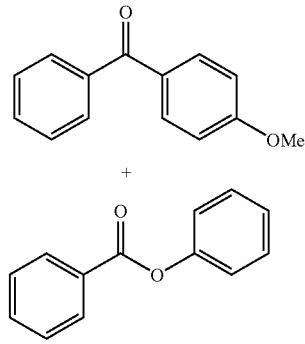

The reagents are dissolved in a solution of chlorobenzene. The concentration of anisole is 2 millimoles and that of the benzoyl chloride is 1 millimole. The solution is then degassed under a stream of argon at ambient temperature for 30 minutes. 0.2 grams of the composite are introduced into the flask, then the atmosphere of the reactor is purged under a stream of argon at ambient temperature for 30 minutes. The flask is closed and the temperature is brought to 120° C. The acylation is followed by gas phase chromatography. The results obtained as a function of time are reported in Table 3.

TABLE 3

Friedel-Crafts reaction on composite based on carbon nanotubes

| Time under stream (hours) | Anisole (mol. %) | Ketone (I) (mol. %) | Ester (II) (mol. %) |
|---|---|---|---|
| 0 | 100 | | |
| 1 | 89.6 | 4.0 | 6.4 |
| 2 | 69.9 | 19.7 | 10.4 |
| 3 | 56.3 | 31.4 | 12.3 |
| 4 | 53.7 | 34.5 | 11.8 |
| 5 | 42.4 | 46.1 | 11.5 |
| 8 | 28.4 | 60.2 | 11.4 |

Example 6

Decomposition of Hydrazine

The decomposition of hydrazine is a process used industrially in satellite propulsion systems. The principal industrial catalyst is Ir-37%/alumina.

A composite of carbon nanofibers on carbon felt was prepared according to a procedure similar to those of the preceding examples. The composite was subjected to a sonification (1,100 W, 35 kHz) for 30 minutes in order to eliminate any fibers which are not well attached to the felt surface. 267 mg of this composite were impregnated with a solution of $H_2IrCl_6.6H_2O$ containing 215 mg of iridium. The product was dried at 100° C. and then heated to 300° C. for 2 hours in order to transform the iridium salt into oxide. The oxide was then reduced under a stream of hydrogen at 400° C. The final catalyst thus obtained (catalyst A) contained 30% metallic iridium by weight.

Figure 4:
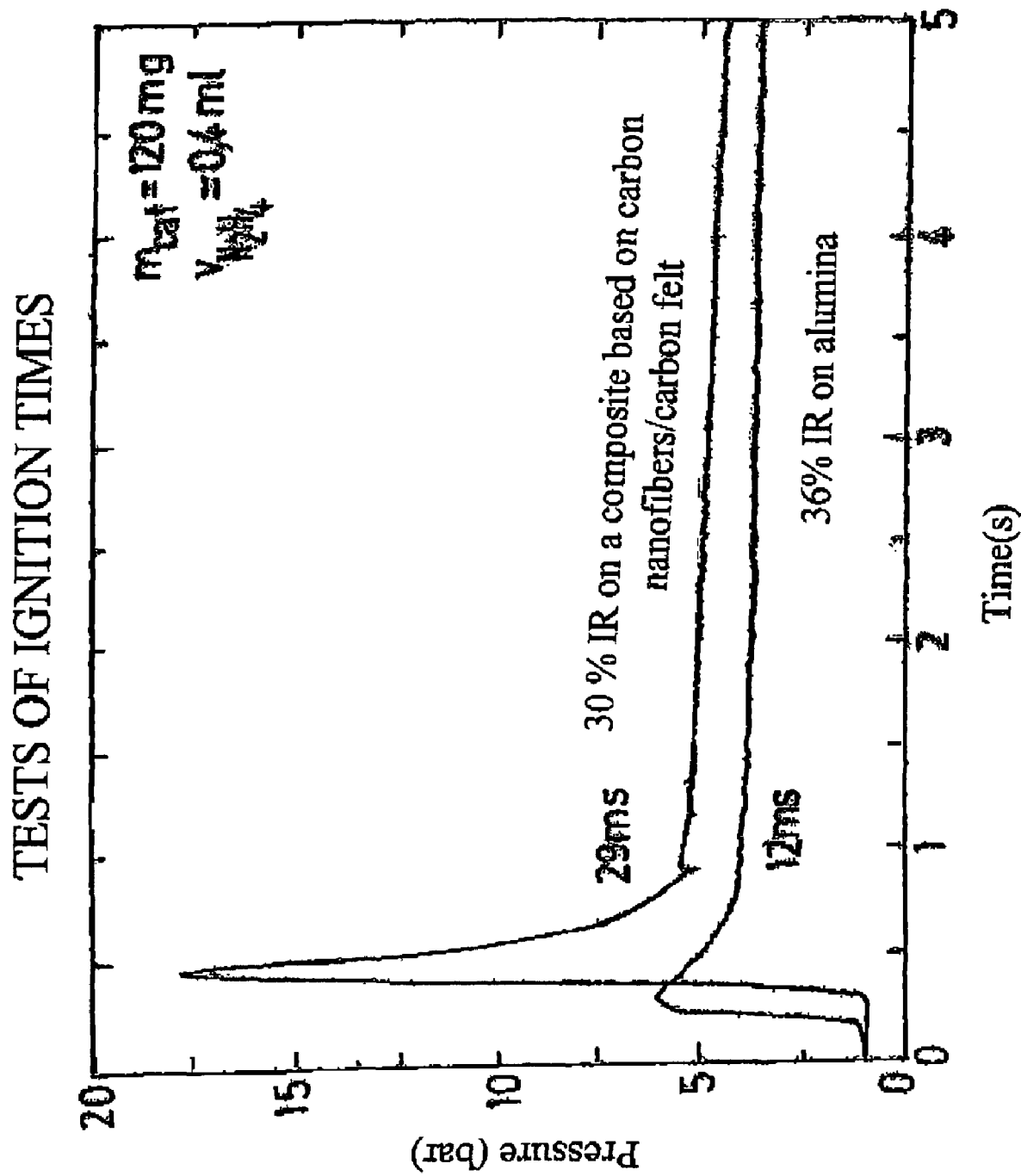
FIG. 4 shows a comparative trial of catalytic decomposition of hydrazine with a catalyst of the invention and a prior art catalyst.

The trials of hydrazine decomposition were performed by injection of 0.4 ml of 99.9% pure hydrazine into a reactor which contained the same quantity (120 mg) of catalyst, namely either the catalyst A (according to the invention, containing 30% by weight of metallic iridium), or an iridium-based catalyst (37% by weight of metallic iridium) on alumina according to the prior art (catalyst B). The results are shown in FIG. 4. It can be seen that, for the same quantity of catalyst (corresponding to a very similar metallic iridium content) and the same quantity of injected hydrazine, the pressure of the gas generated by the decomposition of the hydrazine is about 3 times greater with catalyst A (according to the invention) than with catalyst B (according to the prior art). This decomposition is provided in an interval of time sufficiently short to permit the use of the catalyst according to the invention in a propulsion system, for example for the precise positioning of satellites.

The invention claimed is:

1. A composite consisting essentially of:
an impregnated support activated by impregnation of at least one metal and/or metal salt and carbon nanotubes or nanofibers formed by vapor deposition, wherein the weight of said carbon nanotubes or nanofibers formed on said support is at least 10% of the weight of said composite.

2. Composite according to claim 1, wherein said support is in the form of beads, fibers, felts, extrusions, foams, monoliths or pellets, and said support is activated by impregnation of an aqueous solution of one or more transition metals, followed by drying, calcination and a reducing treatment comprising placing said support in contact with a reducing gas.

3. Composite according to claim 2, wherein said support has, before impregnation, a BET surface comprised between 1 $m^2/g$ and 1,000 $m^2/g$.

4. Composite according to claim 3, wherein said support has, before impregnation, a BET surface comprised between 7 $m^2/g$ and 400 m2/g.

5. Composite according to claim 1, wherein said support is selected from the group consisting of alumina, silica, titanium oxide, zirconium oxide, cordierite, and carbon.

6. A composite of claim 1, wherein weight of said carbon nanotubes or nanofibers is at least 30% of the weight of said composite.

7. A composite comprising carbon nanotubes or nanofibers vapor deposited on a support activated by impregnation, wherein the weight of said carbon nanotubes or nanofibers deposited on said support is at least 10% of the weight of said composite, and wherein said composite is capable of functioning as a support for a catalyst of a chemical reaction in liquid or gaseous media.

8. A composite according to claim 7, wherein said support intended to be activated by impregnation is selected from the group consisting of alumina, silica, silicon carbide, titanium oxide, zirconium oxide, cordierite, and carbon.

9. A composite according to claim 7, wherein said support is in the form of beads, fibers, felts, extrusions, foam, monoliths, or pellets.

10. A composite according to claim 7, wherein said support has, before impregnation, a BET surface comprised between 1 $m^2/g$ and 1,000 $m^2/g$.

11. A composite according to claim 7, wherein said surface of said support intended to receive the deposit of carbon nanotubes or nanofibers has been impregnated with a solution of one or more transition metal salts.

12. A composite according to claim 11, wherein said composite consists essentially of said support, said nanotubes or nanofibers and said one or more salts, and wherein said transition metal is selected from the group consisting of Ni, Fe, Co and Cu.

13. A composite according to claim 11, wherein the impregnation is followed by drying, calcinations and a reducing treatment by placing said support in contact with a reducing gas.

14. A composite according to claim 7, wherein said carbon nanotubes or nanofibers have been formed starting from a gaseous mixture containing molecular hydrogen or an inert gas, and a gas containing carbon.

15. A composite according to claim 14, wherein said gas containing carbon contains carbon monoxide or a hydrocarbon.

16. A composite according to claim 7, wherein the specific surface of said composite, determined by the BET method of adsorption of nitrogen at the temperature of liquid nitrogen according to the Standard NF X 11-627, is greater than 10 $m^2/g$.

17. A composite according to claim 7, that is capable of functioning as a catalyst or catalyzer support in the chemical industry, petrochemical industry, and/or in purification of motor vehicle exhaust gas.

18. A composite according to claim 7, that is capable of functioning as a catalyst or catalyst support, wherein said chemical reactions in liquid or gaseous medium are selected from the group consisting of Friedel-Crafts acylation, decomposition of hydrazine and its derivatives, decomposition of hydrogen peroxide, ammonia synthesis in the presence of $N_2$ and $H_2$, oxidation of CO to $CO_2$.

19. A composite according to claim 18 for the decomposition of hydrazine, wherein an active phase of iridium has been deposited beforehand on the surface of the said carbon nanotubes or nanofibers.

20. A composite according to claim 19 in a propulsion system for satellites.

21. A composite consisting essentially of carbon nanotubes or nanofibers vapor deposited on a support activated by impregnation and an active phase deposited on the surface of the said nanotubes or nanofibers, wherein the weight of said carbon nanotubes or nanofibers deposited on said support is at least 10% of the weight of said composite, and wherein said composite is capable of functioning as a catalyst of a chemical reaction in a liquid or gaseous medium.

22. A composite consisting essentially of carbon nanotubes or nanofibers formed by vapor deposition on a support activated by impregnation, wherein the weight of said carbon nanotubes or nanofibers formed on said composite is at least 10% of the weight of said composite, and wherein said composite is capable of functioning as an electrode in an electrochemical process and/or device.

23. A composite consisting essentially of carbon nanotubes or nanofibers formed by vapor deposition on a support activated by impregnation, wherein the weight of said carbon nanotubes or nanofibers formed on said is at least 10% of the weight of said composite, and wherein said composite is capable of functioning as reinforcement or protection of a material or element working under friction.

24. A process for preparing a composite comprising a support activated by impregnation and carbon nanotubes or nanofibers created by steam deposition, said process comprising:
(i) depositing an active phase on said support by impregnation,
(ii) drying and calcining the impregnated support, and performing a reduction treatment by placing said support in contact with a reducing gas, and
(iii) forming said carbon nanotubes or nanofibers by steam deposition using a gaseous mixture comprising molecular hydrogen or an inert gas, and ethane, wherein the weight of said carbon nanotubes or nanofibers is at least 10% of the weight of said composite.

25. The process according to claim 24, wherein said support is selected from the group consisting of alumina, silica, titanium oxide, zirconium oxide, cordierite and carbon.

26. The process according to claim 24, wherein prior to impregnation, said support has a BET surface area ranging from 1 $m^2/g$ to 1000 $m^2/g$.

27. The process according to claim 24, wherein said support is in the form of beads, fibers, felt, extrusions, foam, monoliths and/or chips.

28. A method for preparing a catalyst or catalyst support comprising steam depositing carbon nanotubes or nanofibers on a support activated by impregnation to form a composite, wherein the weight of said carbon nanotubes or nanofibers is at least 10% of the weight of said composite, said catalyst or catalyst support being suitable for use with chemical reactions in a liquid or gaseous medium, wherein said chemical reactions are selected from among the group consisting of: depolluting exhaust gas from motor vehicles, Friedel-Crafts acylation, the decomposition of hydrazine and its derivatives, the decomposition of hydrogen peroxide, the synthesis of ammonia in the presence of $N_2$ and $H_2$, the oxidizing of CO in $CO_2$, and the hydrogenation of nitroaromatics or aromatics.

29. A method according to claim 28 for hydrazine decomposition, wherein an active iridium phase has been previously deposited on the surface of said carbon nanofibers or nanotubes.

30. A method according to claim 29 in a satellite propulsion system.

31. A method according to claim 28, wherein said support is selected from the group consisting of alumina, silica, silicon carbide, titanium oxide, zirconium oxide, cordierite and carbon.

32. A method according to claim 28, wherein said support is in the form of beads, fibers, felt, extrusions, foam, monoliths and/or chips.

33. A method according to claim 28, wherein said support, prior to impregnation, has a BET surface area ranging from 1 $m^2/g$ to 1000 $m^2/g$.

34. A method according to claim 28, wherein a surface of said support intended to receive the carbon nanofibers or nanotubes has been impregnated with a solution of one or more transition metal salts selected from the group consisting of Ni, Fe, Co and Cu.

35. A method according to claim 28, wherein impregnation is following by drying, calcination and a reducing treatment by contacting a reducing gas.

36. A method according to claim 28, wherein said carbon nanofibers or nanotubes have been formed of a gaseous mixture comprising molecular hydrogen or an inert gas, and a gas containing ethane.

37. A method according to claim 28, wherein the weight of said carbon nanofibers or nanotubes formed on said support is at least 10% of the total weight of said composite.

38. A method according to claim 28, wherein the specific surface of said composite, as determined by the BET nitrogen adsorption method at the temperature of liquid nitrogen according to standard NF X 11-621 is greater than 10 $m^2/g$.

39. A composite comprising:
a support activated by impregnation and
carbon nanotubes or nanofibers formed by vapor deposition using a hydrocarbon source of carbon, wherein the weight of said carbon nanotubes or nanofibers formed on said support is at least 30% of the weight of said composite.

* * * * *